Patented Mar. 23, 1926.

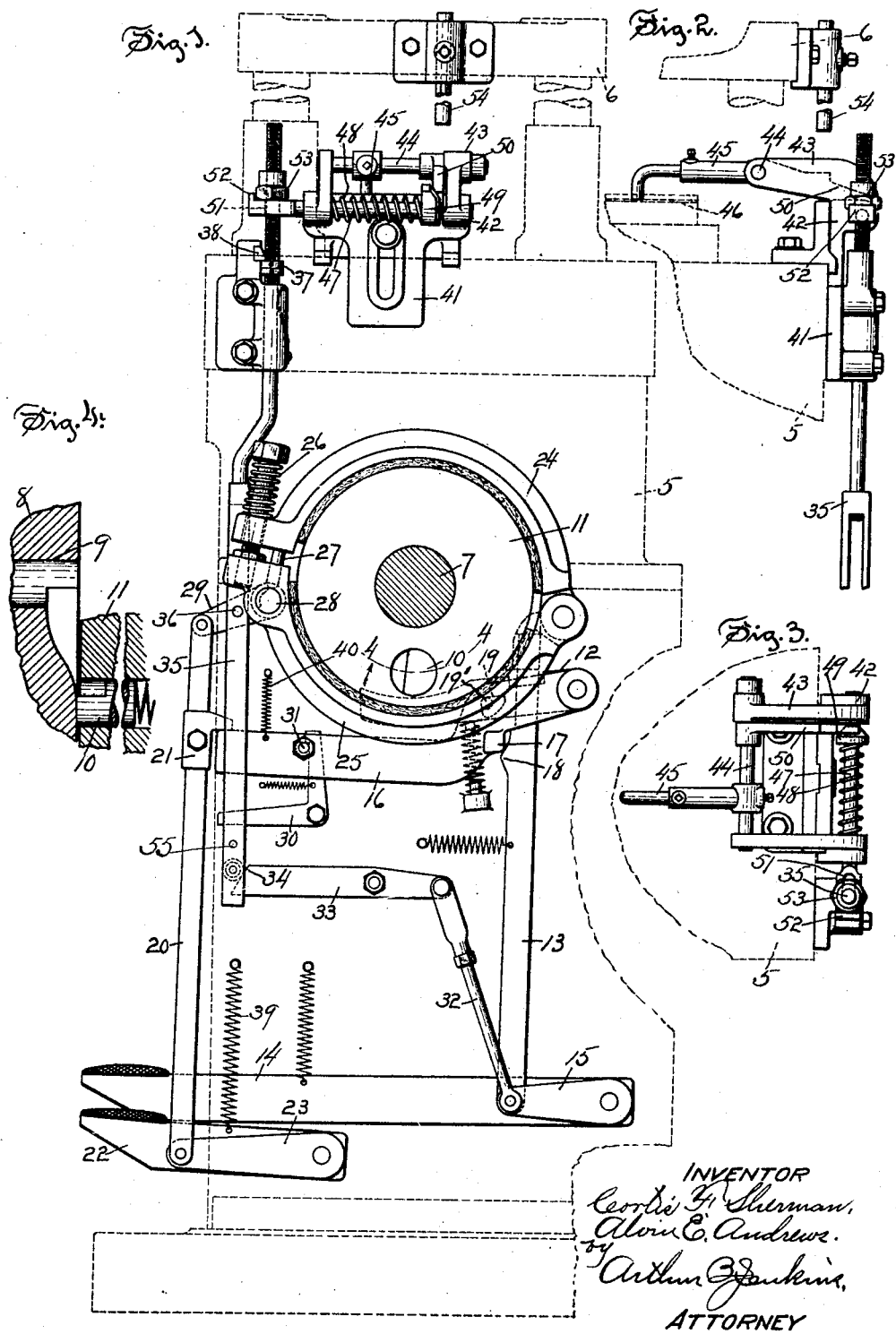

1,578,099

UNITED STATES PATENT OFFICE.

CORTIS F. SHERMAN AND ALVIN E. ANDREWS, OF HARTFORD, CONNECTICUT, ASSIGNORS TO THE HENRY & WRIGHT MANUFACTURING COMPANY, OF HARTFORD, CONNECTICUT, A CORPORATION OF CONNECTICUT.

BRAKE MECHANISM FOR CLUTCHES.

Application filed April 18, 1922. Serial No. 555,113.

*To all whom it may concern:*

Be it known that we, CORTIS F. SHERMAN and ALVIN E. ANDREWS, each a citizen of the United States, and residents of Hartford, in the county of Hartford and State of Connecticut, have invented a new and useful Improvement in Brake Mechanism for Clutches, of which the following is a specification.

Our invention relates to clutches, and more especially to that type as employed in punch presses and the like in which a stopping brake is used, and an object of our invention, among others, is the production of means to prevent heating owing to such brake, and also to reduce to a minimum the power required for the operation of such presses.

One form of mechanism embodying our invention and in the construction and use of which the objects herein set out, as well as others, may be attained, is illustrated in the accompanying drawings, in which—

Figure 1 is a view in side elevation of our improved mechanism shown as mounted on a punch press, the latter being shown in dotted outline and the driving shaft being shown as broken off.

Figure 2 is a view in front elevation of a portion of the mechanism.

Figure 3 is a top view of a portion of the mechanism.

Figure 4 is a detail view of a fragment of the hub of the driving pulley cut in section to show the clutch pin recess.

It has long been a common practice, in the construction of punch presses and machines of this character, to employ clutches as parts of the driving mechanisms, such clutches each being operated usually as by means of a treadle, or other suitable appliance. Each of these machines has been supplied with a driving pulley to impart the required momentum to its mechanism, and in order that such mechanism shall stop in substantially a predetermined position upon the release of power, a brake has been employed to stop rotation of the driving shaft. When such a machine is continuously operated for extended periods the brake causes objectionable heating and in order to overcome such heating and also to remove the requirement for power to overcome its resistance it is the purpose of our present invention to provide means whereby said brake shall be in operation to retard movement only when required to stop the machine, care being taken, however, that such brake shall be in readiness for full operation when required.

Such a mechanism is illustrated in the accompanying drawings in which the numeral 5 indicates the frame of a punch press, that is shown in dotted outline and including a head 6 that is reciprocated vertically by means of a suitable connection with a driving shaft 7, all of which parts may be of any suitable construction that will be readily understood by those skilled in the art and for which reason a further end detailed description is omitted herein. The shaft 7 is driven by means of a pulley 8 mounted to rotate freely on the shaft and on that end toward the observer as the machine is shown in Figure 1. This pulley will receive a belt extended from any suitable source of power, and the hub of the pulley is provided with a clutch pin located in a recess 9 and arranged to be engaged by a clutch pin 10 carried by a clutch disk 11 secured to the driving shaft 7. The clutch pin 10 is seated on a spring that acts to force the pin outwardly to engage its mating clutch pin in a manner that will be readily understood. The clutch pin 10 has a groove to receive a cam shoe 12 that is operated by an intermittent clutch actuating rod 13 extending through the shoe and having a shoulder to engage its upper surface for the purpose of actuating it. Said shoe is spring pressed into position to engage said groove in the pin 10, and the latter, in its revolution, engages the upper end of the rod and moves it from disengagement from said shoe to permit the latter to move into position to again engage the clutch pin 10 and disengage it from its mating clutch pin, and thus stop the operation of the machine at each revolution of the shaft 7, and in a manner that will be readily understood, this mechanism being of old and well known construction.

The rod 13 is operated as by means of a foot treadle 14 pivotally mounted on the frame of the machine and connected by a shaft and arm 15 with said rod, and as shown in Fig. 1 of the drawings. A continuous operating clutch lever 16 is also pivotally mounted on the frame of the machine and has a lug 17 to engage a nose 18 on the rod 13 to hold the latter in disengaged position with respect to the shoe 12 when it is desired to operate the machine continuously by depression of the lever 16. For this purpose the lever 16 has a recess 19 on its face toward the lever 12, and the latter has a pin 19' to engage said recess as shown in dotted lines in Figure 1 of the drawing. A continuous clutch actuating rod 20 has a shouldered lug 21 to engage the lever 16 to operate it and said rod is actuated as by means of a treadle 22 pivotally mounted on the frame and connected by a shaft and arm 23 with said rod.

All of the mechanism thus far described is of old and well known construction and for this reason further and detailed description of its construction and operation are omitted herein, as such will be readily understood by those skilled in the art.

A friction brake comprising two members 24—25 are pivotally mounted to encircle the disc 11, said members being provided with friction shoes, and being pressed toward each other by means of a spring 26 in a manner common to prior devices of this class, this brake also being of old and well known construction.

In carrying our invention into effect we provide a releasing pin 27 extending from the brake member 24 into a recess in the brake member 25, this pin resting in engagement with a brake releasing cam 28 extending through the brake member 25 and projecting on one side thereof, such projecting end having a brake releasing arm 29 rigidly attached thereto and with its end opposite the cam 28 pivotally attached to the actuating rod 20.

From this it will be seen that when the treadle 22 is depressed for continuous operation of the machine it will, through the agency of the rod 20 and lug 21 depress the operating clutch lever 16, and the latter through the agency of the recess 19 and the pin therein will depress the cam shoe 12 in a manner that will be readily understood. The parts will be held in this position as by means of a holding lever 30 pivotally mounted on the frame of the machine and having a shoulder on one arm to engage a pin 31 on the clutch lever 16 in a manner common to devices of this class. The parts are shown in Fig. 1 with the clutch members released for continuous operation of the machine, the brake members also being released from the disk 11. When the clutch rod 20 is moved downwardly it will operate the brake releasing arm 29 to rotate the cam 28 and the latter will force the pin 27 outwardly, thereby separating the brake members 24 and 25 and releasing the pressure of said members upon the clutch disk 11. The cam 28 is so formed that the brake members 24, 25 will be released just before the pin 10 is released by the cam shoe 12 to engage its mating clutch pin in the hub of the pulley, the cam 28 also being formed to permit movement of the releasing pin 27 to cause the brake members 24, 25 to engage the disk 11 just before the shoe 12 engages the pin 10 to disengage it from its mating pin in the hub of the pulley. This ensures that the brake upon the disk 11 will be released just before the mechanism starts to operate, and further that such brake will be caused to engage the pulley and be exercising its full function at the time the clutch is released. When the press has been set in continuous operation as above described, such operation is stopped by pressure upon the foot treadle 14 that through the arm 15 actuates a connecting rod 32 connected with a stop lever 33 pivotally mounted on the frame of the machine and having a cam nose 34 engaging within a cam recess in the lower end of a stop rod 35 there preferably being a roller located in said recess for engagement with said cam nose. This operation of the lever 33 will rock the lower end of the rod 35 on its pivot 36 on the arm 29, thereby disengaging a shoulder 37 thereon from a detent 38 on the frame of the machine and permitting the rod to be forced upwardly under the influence of a treadle spring 39 and also a clutch lever spring 40.

This movement of the rod 35 causes movement of the arm 29 to operate the brake releasing cam 28 and permit the brake members 24 and 25 to frictionally grasp the hub 11 near the beginning of its upward movement, thus applying the brake to stop the machine when the clutch pin 10 is withdrawn in a manner about to be described. Near the end of the upward movement of the rod 35 after the brake members 24 and 25 have been permitted to frictionally grasp the hub 11, a pin 55 engages one end of the holding lever 30 thereby disengaging the opposite end from the pin 31 and allowing the lever 16 and cam shoe 12 each to return to a position to withdraw the pin 10 from its mating pin on the pulley 8 thus allowing the brake members 24 and 25 to stop the machine.

By the use of this mechanism the machine may be run for such periods as may be desired, and the grip of the brake members 24—25 upon the disc 11 being removed unobjectionable heating of parts of the mechanism heretofore occurring in devices of this class will not take place.

In further carrying our invention into effect we connect the brake releasing mechanism, hereinabove described, with a stop motion mechanism so that such brake mechanism will be actuated when the stop mechanism is operated. This latter mechanism comprises a bracket 41 adjustably secured to the frame of the machine with side supports 42 projecting therefrom and bearing arms 43 extending from said supports. A stop finger rock shaft 44 is rotatably mounted in the arms 43 and a stop finger 45 is secured to said shaft in position for its end to rest upon a strip of stock 46 that is inserted in the machine for operating thereon in a manner that will be readily understood. A stop motion rod 47 is mounted for longitudinal movement in the side parts 42 of the bracket, a stop motion spring 48 forcing the rod and a cam detent 49 thereon in a position to press said detent against a stop controller 50 secured to and projecting from the shaft 44, as clearly shown in Fig. 3 of the drawings. An elongated slot 51 in the outer end of the stop motion rod receives the upper end of the stop rod 35, said rod 47 having a disengaging lip 52 operating against a disengaging nut 53 on the rod 35.

In the operation of this mechanism when the strip of stock 46 is first inserted in the machine the stop finger 45 may be raised to permit the stock to be moved under it, the elongated slot 51 permitting endwise movement of the stop motion rod 47 sufficiently for this purpose. The finger now being placed in engagement with the strip of stock the parts will be maintained in the position shown in Fig. 1 so long as the machine is operating. Should however the strip of stock pass from under the stop finger, the latter will drop and the stop controller 50 will be moved into position to permit movement of the cam detent 49 under the influence of the spring 48. This will cause the lip 52 in engagement with the nut 53 to move the upper end of the rod 35 thereby disengaging the shoulder 37 from the detent 38, and the rod 35 will therefore be forced upwardly in the manner hereinbefore described to stop the machine, in this operation the brake mechanism being operated to cause engagement of the brake members with the clutch disk 11 before the pin 10 is disengaged from its mating pin.

It is desirable at certain times that all pressure upon the strip of stock 46 shall be released, and when the head 6 is in its lowermost position. For this purpose a releasing rod 54 is carried by the head 6 to engage the stop controller 50, downward movement of the releasing rod 54 engaging such controller and thereby lifting the finger from the strip of stock 46 in a manner that will be readily understood.

In accordance with the provisions of the patent statutes we have described the principles of operation of our invention, together with the device which we now consider to represent the best embodiment thereof; but we desire to have it understood that the device shown is only illustrative and that the invention may be carried out by other means and applied to uses other than those above set out.

We claim:

1. A driving mechanism including a clutch, driven mechanism to be actuated by said driving mechanism, means for retarding movement of said driven mechanism, a clutch member for actuating said clutch, and a brake actuating cam having an arm secured thereto, said arm being pivotally mounted on a pivot carried by said clutch actuating member and also being adapted for operating said retarding means.

2. A driving mechanism including a clutch, a brake for said driving mechanism including a plurality of members for actuating said clutch, and means operatively connecting each of said clutch actuating members and said brake to cause operation of said brake by either of said members.

3. A driving mechanism including a clutch, a brake for said driving mechanism, a plurality of actuating members for actuating said clutch, and means operatively connecting said clutch actuating means and said brake and including a brake actuating member pivotally supported by one of said clutch actuating members.

4. A driving mechanism including a clutch, a brake comprising encircling brake members, means for forcing said brake members together, brake releasing means operatively connected with said brake members to separate them and including a rigidly connected arm, and a plurality of clutch operating members pivotally connected with said arm for independent operation thereof.

5. A driving mechanism including a clutch, brake members encircling a clutch member, clutch operating mechanism, a cam operatively connected with said brake members and rotatably mounted to separate said members to release the brake, an arm rigidly secured to said cam, and a clutch actuating member pivotally supported by a member of said clutch operating mechanism to operate said cam to effect releasing action of said brake.

6. A driving mechanism including a clutch, brake members encircling a clutch member, a cam rotatably mounted and operatively connected with said brake members to separate them, a cam arm rigidly secured to said cam, a clutch actuating mechanism including a reciprocating member upon which said cam arm is pivotally supported for rotation to separate said brake members.

7. A driving mehanism including a clutch, brake members encircling a clutch member, a cam rotatably mounted and operatively connected with said brake members to separate them, an arm extending from said cam, a clutch actuating mechanism including a clutch actuating rod secured to said cam to operate it and a stop rod upon which said arm is pivotally mounted.

8. A driving mechanism including a clutch, brake members encircling one of the clutch members, a clutch releasing pin extending from one of said brake members, a cam rotatably mounted in the other of said brake members and in contact with said pin, clutch actuating mechanism, and an operative connection between said clutch actuating mechanism and said cam for operating the latter.

9. A driving mechanism including a clutch, intermittent clutch actuating mechanism, a continuous clutch actuating mechanism including a stop rod, and an operative connection between said intermittent clutch actuating mechanism and said stop rod for operating the latter.

10. A driving mechanism including a clutch, intermittent clutch actuating mechanism, continuous clutch actuating mechanism including an actuating clutch lever, and an operative connection between said intermittent clutch actuating mechanism and said clutch lever for operating the latter.

11. A driving mechanism including a clutch, intermittent clutch actuating mechanism, continuous clutch actuating mechanism including a clutch lever and a stop rod, means operatively connected with said rod and for holding said lever in one position, and an operative connection between said intermittent clutch actuating mechanism and said rod for operating the latter.

12. A driving mechanism including a clutch, a clutch operating lever, means for operating said lever, means for holding said lever in one position against force applied to move it to another position, a pivotally mounted stop rod operatively connected with said clutch lever, an intermittent clutch operating mechanism, and a connection between said intermittent clutch operating mechanism and said stop rod for operation of the latter.

CORTIS F. SHERMAN.
ALVIN E. ANDREWS.